June 16, 1931. G. H. STONER 1,810,092
INTERNAL EXPANSION BRAKE
Filed July 13, 1927
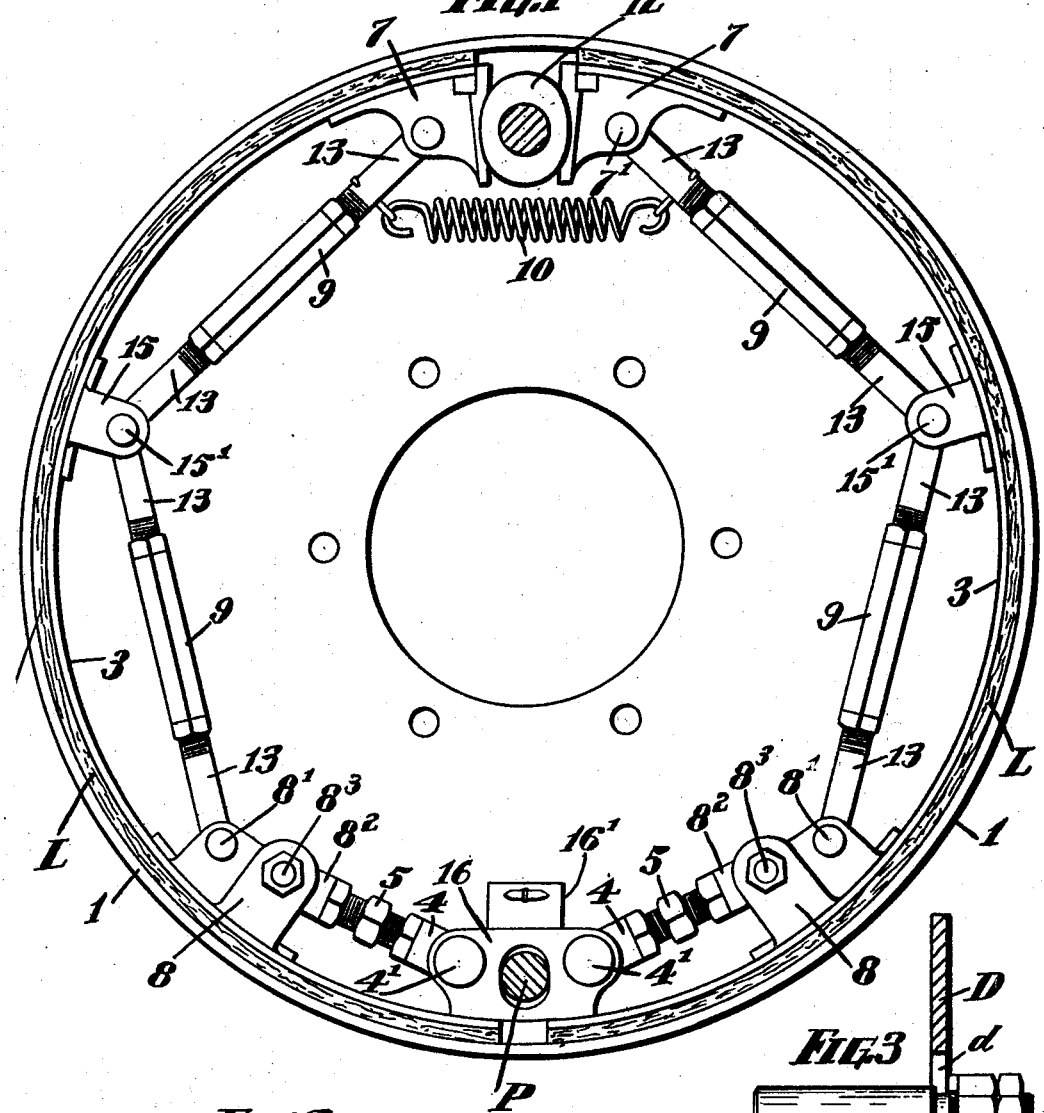
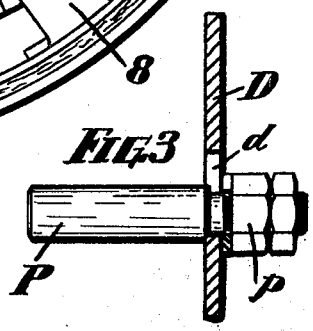
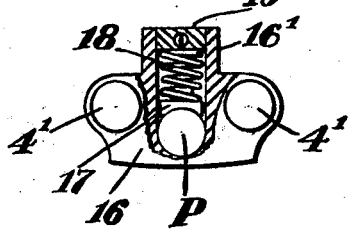
Inventor
George H. Stoner
By Attorney Patented June 16, 1931

1,810,092

UNITED STATES PATENT OFFICE

GEORGE H. STONER, OF EAST BOSTON, MASSACHUSETTS, ASSIGNOR, BY MESNE ASSIGNMENTS, TO STONER-AMES BRAKE COMPANY, INC., OF BOSTON, MASSACHUSETTS, A CORPORATION OF MASSACHUSETTS

INTERNAL EXPANSION BRAKE

Application filed July 13, 1927. Serial No. 205,478.

My present invention relates to internal expansion brakes and like devices in which two or more shoe members are mounted within an enclosing drum or band for frictional contact therewith. In its more specific application my invention relates to such devices in which the shoes are adjustable as to curvature. In such a shoe structure as previously described by me in my prior Patents Nos. 1,550,398 and 1,550,399 and Reissue Patent No. 16,484 the adjusting strut members subtended the arc formed by the curved shoe and due to the pivotal mounting of the shoes by an interposed hinge there was left a space or gap between the shoes. This caused a loss of contact surface which proportionately decreased the efficiency of the brake. As this difficulty is one which might occur in other types of brakes it is to be understood that the reference to my previous patents and the manner of adjustability is one of illustration rather than limitation. In the form shown of my invention the matter of adjustment does enter into the combination and adds an important feature to the invention, but I desire to have it understood at the outset that in its broader aspects my present invention is not necessarily limited to an adjustable brake shoe structure nor to a particular type of brake, as will hereinafter appear. The general object of my present invention is to utilize to the greatest possible extent the available peripheral braking surface so that there will be as near as possible to a complete braking contact all around the brake. The form illustrated in the accompanying drawings is a practical and efficient structure and serves to illustrate the several features involved in the invention herein presented.

In these drawings:

Fig. 1 is an elevation of a brake drum of conventional type with adjustable shoes installed in accordance with my invention.

Fig. 2 is a partly sectioned detail of the anchor pin rider, and

Fig. 3 a fragmentary view showing the mounting of the anchor pin as provided for radial adjustment.

In these drawings I have indicated at 1 a drum within which is mounted a pair of flexible shoes 3 provided with the usual lining L. The shoes may be operated by a usual cam 12 and at the cam end are provided with fittings 7 while just short of their opposite ends they are provided with fittings 8 and intermediate of these end fittings with brackets 15. The reversely threaded turn buckles 9 receive threaded stems 13 which are pivoted at $7^1$, $15^1$ and $8^1$ to their respective brackets. The brackets 8 carry pivoted studs $8^2$ adjustable on the bolts $8^3$ which receive the reversely threaded adjusting connections 5 which at their opposite ends are threaded into stud 4 pivoted at $4^1$ in a rider block 16. This rider block is slotted to receive the anchor pin P and has a vertical chamber $16^1$ in which is a saddle 17 held down by a spring 18 which in turn is confined by a plug 19. This arrangement permits the rider 16 to move radially of the brake assembly. The pin P is shown as mounted in a usual dust plate D which appears in Fig. 3. This plate is slotted as at $d$ and the pin P passes through the slot $d$ and is held by nuts $p$. This permits the anchor pin P to be radially adjusted so that the block 16 may be always positioned under a suitable compression of the spring 18. As the adjustability of my flexible shoes 3 have been fully described in my prior patents, I need only say that the curvatures of the shoes is controlled by turning the turn buckles 9 so as to take up on or to extend the effective length of its assembly with the pivoted externally threaded members 13. That is to say, the turn buckle 9 with its threaded members 13 may be shortened or lengthened by simple rotation so that considered as the subtending chord of the arc formed by the shoe 3 it may be lengthened or shortened thus flattening or curving the subtended portions of the shoe to provide for proper adjustment of curvature. There may be any number of these struts provided for each shoe, but the double strut structure shown provides for sufficient clearance of hub and in practice affords ample control for brake shoes of any ordinary dimensions at present used in motor vehicles.

It will be noted that the brackets 8 are positioned within the lower ends of the shoes 3, This positioning of the brackets relative to the anchor pin P is necessary in order to provide for adjustment through the connections 5 through which the shoes when given their proper curvature may be moved circumferentially of the brake drum to make contact with the cam 12 against which they are held by the spring 10.

As heretofore pointed out this spacing of the brackets 8 to provide adjustment relative to the anchor pin P originally left a gap between the brake shoes at the lower end. In accordance with my present invention I extend the shoes 3 beyond the bracket 8 so that they are closely adjacent to each other and under the rider 16 which has a curved lower face adapted to contact with the shoe ends when the shoes are expanded by the rotation of the cam 12. It will also be noted that the adjustable connections 5 are disposed in toggle relation to the block 16 so that as the shoes are expanded by the cam 12 there is a slight outward thrust on the block 16 which moves it radially of the brake on the anchor pin P and causes it to contact on its lower face with the free ends of the shoes 3 so that these ends are forced positively against the brake lining. When the cam is released and the shoes returned to their contracted position by the spring 10 the rider 16 is lifted by its spring 18 and pressure on the ends of the shoes is relieved so that both shoes throughout their entire length come clear of the drum with the desired clearance for which the brake is adjusted. It is further pointed out that whether the car is rolling ahead or in reverse the brake shoes are energized by the rotative effect equally in either direction. In practice there is a slight play left in the opening in the block 16 for the anchor pin P so that whichever shoe is energized by rotative movement of the drum, the resultant is symmetrically transmitted to the opposing shoe which is backed up by the adjacent face of the cam 12 so that braking pressure is uniformly distributed on the drum and symmetrical expansion obtained.

While the brake structure illustrated is shown of the two shoe type, obviously any number of shoes may be employed and these shoes may be of any type, although applicant believes that the highest efficiency is attained with the adjustable type of shoe in accordance with his prior inventions. All such modifications in the construction and arrangement of parts whether by way of addition or omission are to be construed as contemplated by the invention as defined in the appended claims.

What I therefore claim and desire to secure by Letters Patent is:

1. In a brake, a pair of shoe members having free cam contacting ends, an anchor pin set opposite thereto, a slotted member mounted on said pin and overlying the adjacent ends of the shoes in bearing relation thereto and adjustably connected thereto within the ends and radially movable upon the expansion of the shoes to contact the adjacent shoe ends.

2. In a brake, a pair of shoe members having free cam contacting ends, an anchor pin set opposite thereto, a slotted member mounted on said pin and overlying the adjacent ends of the shoes in bearing relation thereto and pivoted thereto within the ends and radially movable upon the expansion of the shoes to contact the adjacent shoe ends.

3. In a brake, a pair of shoe members having free cam contacting ends, a radially acting shoe support set opposite thereto, and effective on the adjacent ends of the shoes on expansion to press out said ends.

4. In a brake, a pair of shoe members, a radially movable member overlying an end of each and a toggle connection between said member and said shoes effective on expansion to press said member on the adjacent shoe ends.

5. In a brake, a pair of shoe members having free cam contacting ends, an anchor pin set opposite thereto, a slotted member mounted on said pin and overlying the adjacent ends of the shoes in bearing relation thereto and hinged thereto within the ends and radially movable upon the expansion of the shoes to contact the adjacent shoe ends.

6. In a brake, a pair of shoe members, an operating cam disposed between adjacent ends thereof, an oppositely disposed shoe support and overlying the adjacent ends of the shoes in bearing relation thereto and radially movable upon the expansion of the shoes to contact the adjacent shoe ends.

7. In a brake, a pair of shoe members, a pivot pin disposed adjacent an end of each, an interposed member pivotally linked to the adjacent shoe ends and slotted to receive said pivot, and means for yieldingly supporting said member on said pin.

8. In a brake, a pair of brake shoe members, a fixed anchor pin, an anchor block pivotally carried by said pin and having hinge connections with each of said shoes, and a spring connection between said block and pin urging the former inwardly away from the latter.

In testimony whereof I affix my signature.

GEORGE H. STONER.